UNITED STATES PATENT OFFICE.

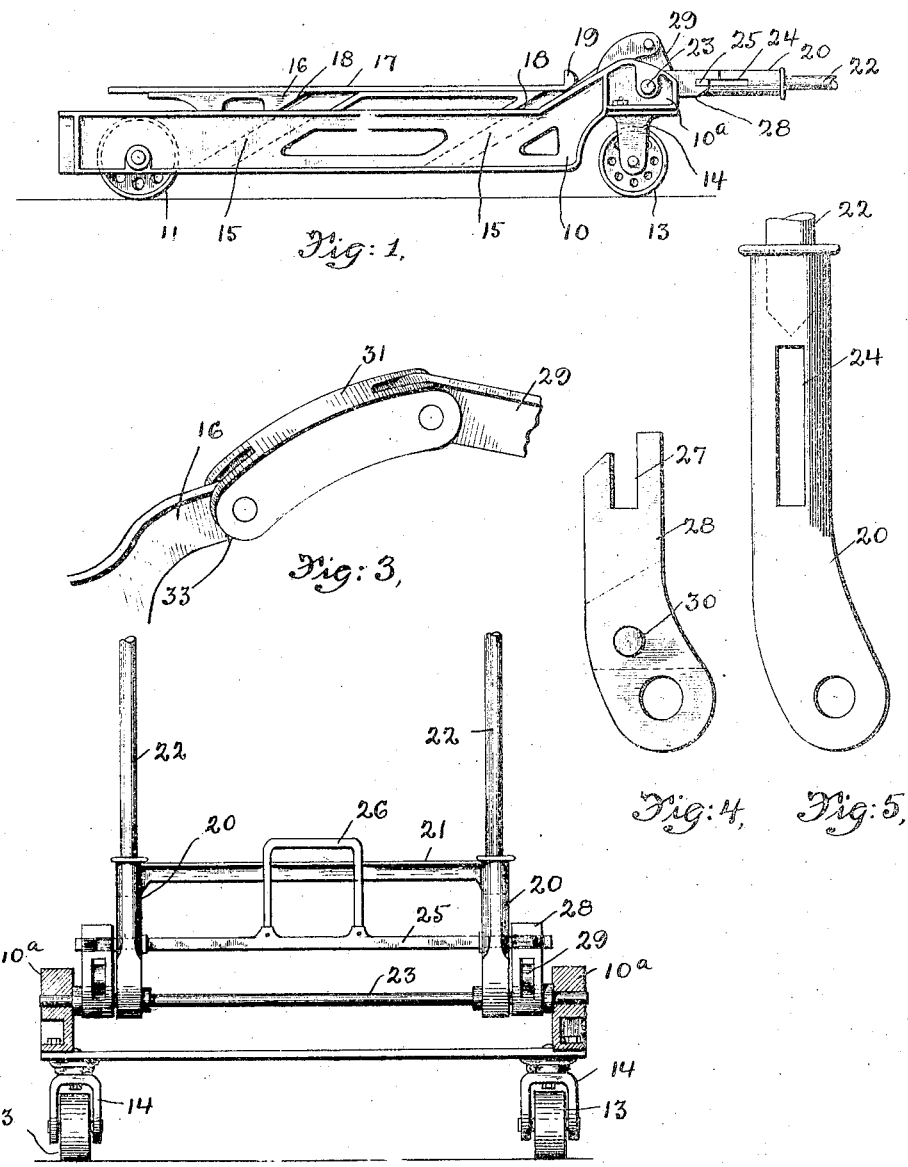

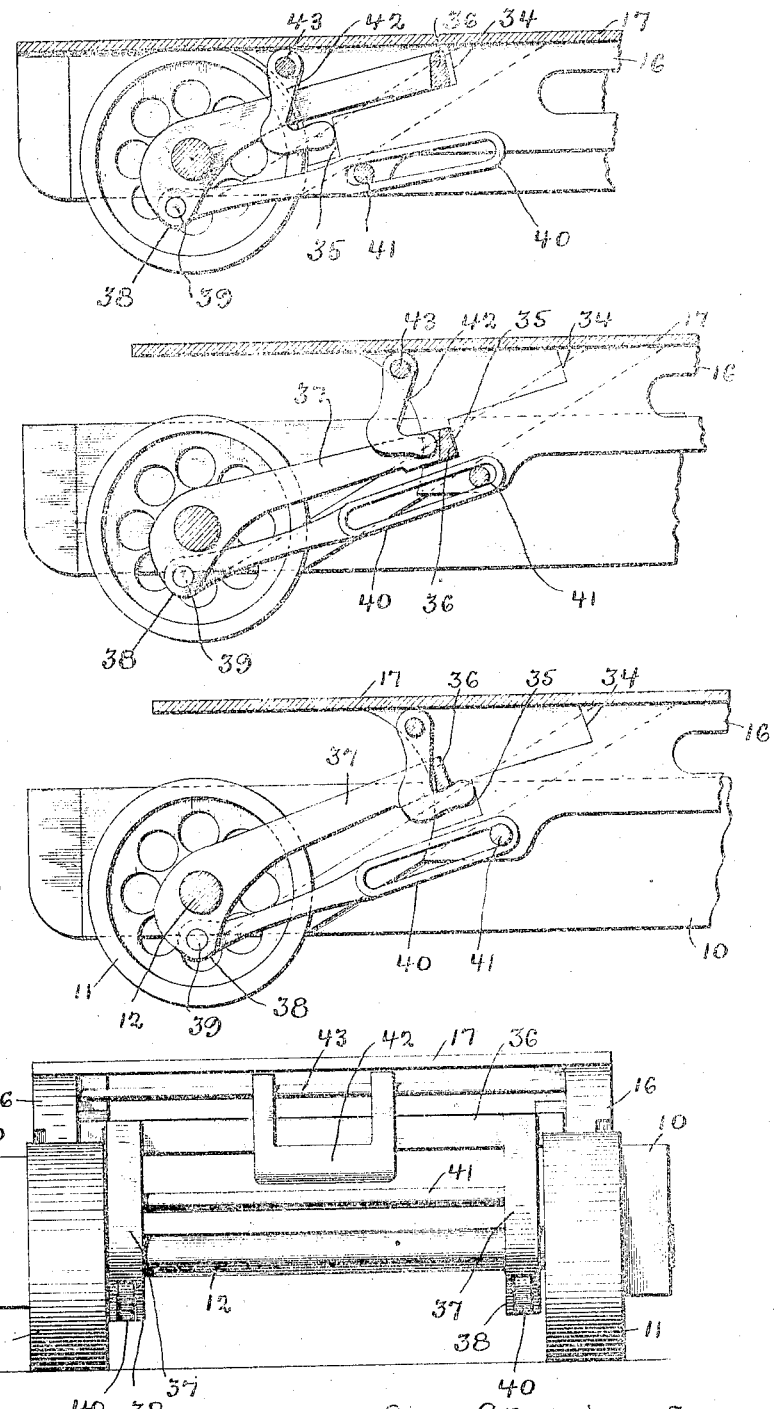

CARL E. M. MILLER, OF NEW YORK, N. Y.

LIFTING-TRUCK.

1,104,532.

Specification of Letters Patent.

Patented July 21, 1914.

Application filed June 6, 1913. Serial No. 772,072.

*To all whom it may concern:*

Be it known that I, CARL E. M. MILLER, of the city, county, and State of New York, have invented a new and useful Improvement in Lifting-Trucks, of which the following is a full, clear, and exact description.

My invention relates to improvements in that class of trucks which are placed beneath an object to be transported, and then elevated so as to lift the object off the floor in order that it can be conveniently moved.

My invention relates more particularly to that class of lifting trucks in which the handle serves as a lever so that when pulled forward and depressed, it actuates the lifting mechanism and raises the object or article to be moved. An objection to some of the trucks of this class is that while the handle serves as a lever, it is awkward in certain ways, and especially because it cannot be moved freely without affecting the load in moving the truck from place to place.

The object of my invention is to produce a truck of this class in which the handle serves as a lever to operate the lifting mechanism, but in which a simple device is used for freeing the handle so that it can be moved freely without affecting the load, and thus facilitate the handling of the truck.

Another object of my invention is to produce a simple and reliable locking mechanism which will hold the truck parts securely in an elevated position, but which can be easily released by a movement of the handle or lever.

Another object of my invention is to make the truck as simple as possible, to the end that strength and utility can be subserved.

Reference is to be had to the accompanying drawings forming a part of this specification, in which similar reference characters indicate corresponding parts in all the views.

Figure 1 is a side elevation with a part of the handle broken away, of the truck showing my improvements. Fig. 2 is a broken front elevation with parts in section. Fig. 3 is a detail perspective view of a set of links connecting the handle mechanism with the top frame of the truck. Fig. 4 is a detail of one of the arms operating in connection with the handle or lever. Fig. 5 is a broken detail side elevation of the handle yoke or socket member. Fig. 6 is a broken longitudinal section showing the locking parts of the truck, and with the top frame depressed. Fig. 7 is a view similar to Fig. 6 but with the top frame elevated and locked. Fig. 8 is a view similar to Fig. 7 but with the parts actuated so as to release the locking device, preparatory to dropping the top frame, and Fig. 9 is a rear elevation of the truck.

The truck is provided with a main or lower frame 10 which at the rear end is mounted on wheels 11 supported on an axle 12, and at the front end the main frame is raised slightly as shown at 10ª and provided with wheels 13 which are journaled in swivel forks 14, like ordinary casters, so as to permit the truck to be readily turned. The lower frame is provided with inclined parts 15, and the upper frame 16 has a top 17 and inclined parts 18 which ride on the inclined parts 15 of the lower frame, so that when the upper frame is pulled forward, the inclines 18 will slide upon the inclines 15, and the top frame and its load will be raised. There is nothing new about this arrangement, and so it is not shown in great detail.

The top frame is provided with a stop 19 at its front edge to prevent the load from sliding forward and interfering with the working parts. The truck has a lever handle at its front end, and this handle is preferably provided with a yoke having socket members 20 which are connected by a cross bar 21, and in which the handle members 22 are fixed. The socket members 20 are secured to a shaft 23 which is journaled in the main frame as shown in Fig. 2. Obviously the detail of the handle construction can be departed from without affecting the invention.

The socket members 20 of the handle are longitudinally slotted as shown at 24, so as to receive a locking bar 25 which can be moved up and down in the slots 24, and which projects through the ends thereof, the locking bar having a handle 26 by which it may be raised, which handle bar also serves as an abutment which is acted on by the cross bar 21 of the handle yoke. The locking bar 25 is also adapted to enter the slots 27 in the outer ends of the arms 28, which are secured to the shaft 23 and have studs 30 or equivalent connections with the links 29, these having a flexible connection by means of the links 31 (see Fig. 3) with the ears 33 at the front end of the top frame 16. It will be seen, therefore, that when the handle is depressed, and the locking bar 25 is connected with the arms 28, the arms 28 will also be moved forward and downward, and pulling on the link connection with the top frame 16, will pull the frame forward so that it will slide upward on its inclines 18, and be elevated. The frame is locked in the elevated position as hereinafter described. Now, after the frame 16 has been raised and locked, the locking bar can be pulled out of engagement with the arms 28 and then the handle comprising the parts 20, 21 and 22, can be freely moved up and down to handle the truck, without danger of interfering with the working parts of the truck. This is a great advantage, because it is necessary to move the handle up and down and in various positions in handling the truck efficiently. When the load is to be moved up or down, the locking bar 25 is placed in engagement with the arms 28.

The locking and releasing mechanism for the movable frame 16 is shown in Figs. 6 to 9. The frame 16 is provided with shoulders 34 and 35, these being located on the sides of the frame, and they are engaged by a pawl 36 which as shown is in the form of a cross bar having arms 37 which are pivoted on the rear axle 12 of the truck. When the movable or top frame 16 is depressed, the pawl 36 is in engagement with the forward and upper shoulder 34, as shown in Fig. 6, and the frame can not drop farther. When however, the movable frame 16 is pulled forward to raise its load, the pawl 36 drops behind the shoulders 35, and the top frame is thus locked in its elevated position.

The arms 37 of the pawl 36 have depending or extension ends 38 which drop below the axle 12, and which are pivotally connected as shown at 39 with the slotted links 40, and these ride on a stud 41 on the frame 16. When the frame 16 is pulled forward and upward, the stud 41 will be nearly to the front end of the slots in the links 40, as shown in Fig. 7. If, now, the frame is pulled a little farther, the stud 41 will pull on the links 40 and so on the extensions 38 of the arms 37, and this will raise the pawl 36 out of engagement with the shoulder 35, this being easily effected because the slight forward movement of the top frame will release the shoulder from frictional contact with the pawl 36. When the pawl is raised as just described, an elbow dog 42 which is pivoted on the stud 43 just behind the pawl 36, swings beneath the pawl and holds it above the shoulder 35 as shown clearly in Fig. 8, and then the top frame 16 can slide back to its depressed position shown in Fig. 6, and deposit its load.

It will be seen from the foregoing description that the structure which I have shown and described is very simple, that the movable frame can be easily operated by the lever handle, that the handle can be easily released from the locking mechanism, and that a very simple means is employed for locking and releasing the movable frame of the truck. It will be further observed that the handle when in engagement with the arms 28, acts as a lever to raise and lower the movable frame, but that the handle when released, simply serves as a handle for moving the truck and for no other purpose. It is not, however, necessary to release the bar 25 in order that the handle may be used for ordinary purposes of moving the truck, as it can be used in the regular way, because the link connection between the parts 28 and the top frame, being a loose connection, provides for a good deal of freedom of movement; but where still greater freedom is desired, it can be obtained by releasing the locking bar as stated. This also enables the handles to be folded back flat on the top of the truck if desired, as for instance in shipping.

I claim:—

1. A lifting truck comprising a wheeled main frame, a top frame mounted on the main frame and arranged to rise and fall when moved longitudinally on the main frame, swinging slotted arms pivoted on the main frame, a link connection between the arms and the top frame, a lever handle mounted on the main frame near the aforesaid arms, said handle having a cross-bar and a locking bar slidable on the handle, said locking bar being adapted to enter the slotted arms and having an abutment thereon to engage the cross-bar of the lever handle.

2. A lifting truck comprising a main wheeled frame, a top frame movable up and down on the main frame, said top frame being provided with a plurality of abutments or shoulders, a swinging pawl pivoted on the main frame and adapted to engage the aforesaid shoulders or abutments, means for releasing the pawl from the shoulders or abutments by a movement of the top frame, and automatic means for holding the pawl out of the path of one of said abutments.

3. A lifting truck comprising a main wheeled frame, a top frame arranged to slide longitudinally and vertically on the main frame, said top frame being provided with a plurality of shoulders spaced apart, means for moving the top frame longitudinally, a pawl pivoted on the main frame and adapted to engage the aforesaid shoulders, and a link connection connected to the pawl and to the top frame, whereby excessive movement of the top frame will tilt the pawl and release the top frame.

4. In a lifting truck the combination with the main wheeled frame and the top frame arranged to slide longitudinally and vertically thereon, said top frame being provided with shoulders arranged one behind the other, of a tilting pawl pivoted on the main frame and adapted to drop into engagement with said shoulders, said pawl having a lower extension behind its pivot, a link connection between said extension and the top frame, and a dog pivoted behind the pawl and adapted to swing into engagement with the pawl when the latter is raised.

5. A lifting truck comprising a main wheeled frame, a top frame movable up and down on the main frame, said top frame being provided with a plurality of abutments or shoulders, a swinging pawl pivoted on the main frame and adapted to engage the aforesaid shoulders or abutments, and means for releasing the pawl from the shoulders or abutments by the movement of the top frame.

CARL E. M. MILLER.

Witnesses:
WARREN B. HUTCHINSON,
ARTHUR G. DANNELL.